UNITED STATES PATENT OFFICE.

MARTIN B. GROUT, OF NORTH YAKIMA, WASHINGTON, ASSIGNOR OF ONE-HALF TO THOMAS W. MOORE, OF SAME PLACE.

COMPOSITION OF MATTER FOR REPAIRING TIRES.

SPECIFICATION forming part of Letters Patent No. 632,110, dated August 29, 1899.

Application filed February 20, 1899. Serial No. 706,278. (No specimens.)

*To all whom it may concern:*

Be it known that I, MARTIN B. GROUT, a citizen of the United States, residing at North Yakima, in the county of Yakima and State of Washington, have invented certain new and useful Improvements in Compositions of Matter for Repairing Tires, &c.; and I do hereby declare the following to be a full, clear, and exact description of the invention, such as will enable others skilled in the art to which it appertains to make and use the same.

My invention relates to improvements in compositions of matter for use in repairing punctures, fractures, or apertures in rubber goods, such as rubber tires, rubber cloth, and rubber tubing of all kinds, and it is also used in vulcanizing and for other purposes.

The composition of matter consists of the following ingredients, in or about the following proportions: stamp-rubber, unvulcanized, two and one-half pounds; benzin, one-half gallon; turpentine, one-half pint; collodion, one-half pint. These ingredients are compounded as follows: The stamp-rubber is placed in the benzin and allowed to remain for twenty-four hours, then add the turpentine and collodion, stir thoroughly, then seal up air-tight and let stand for forty-eight hours and the composition is ready for use.

To use the composition, simply spread or place over the crack or aperture so as to coat or cover the aperture or crack thoroughly.

To use this composition in repairing a bicycle-tire, use the ordinary repair-gun, inserting the nozzle from the outside of the tire or tubing, inject a small quantity of the composition, remove the tool, and pinch the tire over the aperture, so as to coat the inside of the tire around the aperture thoroughly, then insert the nozzle again and inject a small quantity of the composition, remove the tool, pinch the tire slightly to distribute the composition properly, and the operation is completed.

Having thus described my invention, what I claim, and desire to secure by Letters Patent of the United States, is—

1. A composition of matter for use in repairing rubber goods, which consists of unvulcanized rubber, benzin, turpentine and collodion.

2. A composition of matter for use in repairing rubber goods, comprising stamp-rubber two and one-half pounds, benzin one-half gallon, turpentine one-half pint, collodion one-half pint, compounded in or about the proportions stated, and substantially as described.

In testimony whereof I affix my signature in presence of two witnesses.

MARTIN B. GROUT.

Witnesses:
INETTE WASHBURN,
FRED PARKER.